United States Patent
Imamura et al.

(10) Patent No.: US 8,583,032 B2
(45) Date of Patent: Nov. 12, 2013

(54) COMMUNICATION SYSTEM, COMMUNICATION RELAY APPARATUS, AND COMMUNICATION RELAY METHOD

(75) Inventors: Daichi Imamura, Kanagawa (JP); Ayako Horiuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1072 days.

(21) Appl. No.: 11/909,610

(22) PCT Filed: Mar. 29, 2006

(86) PCT No.: PCT/JP2006/306176
§ 371 (c)(1),
(2), (4) Date: Sep. 24, 2007

(87) PCT Pub. No.: WO2006/104105
PCT Pub. Date: Oct. 5, 2006

(65) Prior Publication Data
US 2009/0047898 A1 Feb. 19, 2009

(30) Foreign Application Priority Data
Mar. 29, 2005 (JP) ................................. 2005-095343

(51) Int. Cl.
*H04B 3/36* (2006.01)
(52) U.S. Cl.
USPC ............................................. 455/7; 455/11.1
(58) Field of Classification Search
USPC ............ 455/7, 11.1, 13.1, 16, 69, 522, 67.11, 455/502, 551, 434, 45.2, 561, 574; 370/335, 342, 354, 282, 310, 320, 321, 370/315, 466, 445, 436, 411, 428
See application file for complete search history.

(56) References Cited

U.S. PATENT DOCUMENTS

| | | | |
|---|---|---|---|
| 5,233,626 A | * | 8/1993 | Ames ............................ 375/148 |
| 7,194,262 B2 | | 3/2007 | Aoki et al. |

(Continued)

FOREIGN PATENT DOCUMENTS

| | | |
|---|---|---|
| EP | 001115261 | 7/2001 |
| JP | 5183579 | 7/1993 |

(Continued)

OTHER PUBLICATIONS

PCT International Search Report dated Jun. 19, 2006.

(Continued)

*Primary Examiner* — Edward Urban
*Assistant Examiner* — Golam Sorowar
(74) *Attorney, Agent, or Firm* — Dickinson Wright PLLC

(57) ABSTRACT

A communication relay method and others are disclosed in which even when the channel quality varies, the communication data from MS can be relayed without degrading the throughput of the communication system. In this method, the channel quality between RS and BS is estimated (ST1010), and a determination criterion, which is used to determine whether to relay communication, is established based on the estimated channel quality (ST1020). More specifically, a severe determination criterion is set for a relay route having a bad channel quality between RS and BS, while a less severe determination criterion is set for a relay route having a good channel quality between RS and BS. On the other hand, the channel quality between MS and RS is also estimated (ST1030). Then, after both ST1020 and ST1030 are completed, the channel quality between MS and RS is compared to the determination criterion established in ST1020 to ultimately determine whether to relay the communication data from MS in ST1040.

15 Claims, 15 Drawing Sheets

(56) References Cited

U.S. PATENT DOCUMENTS

| | | | |
|---|---|---|---|
| 2004/0229563 A1 | 11/2004 | Fitton et al. | |
| 2004/0266339 A1* | 12/2004 | Larsson | 455/7 |
| 2005/0014464 A1* | 1/2005 | Larsson | 455/11.1 |
| 2005/0058104 A1* | 3/2005 | Yomo et al. | 370/335 |
| 2005/0130692 A1* | 6/2005 | Furukawa et al. | 455/522 |
| 2005/0266797 A1* | 12/2005 | Utsumi et al. | 455/7 |

FOREIGN PATENT DOCUMENTS

| | | |
|---|---|---|
| JP | 07321772 | 12/1995 |
| JP | 2003332977 | 11/2003 |
| JP | 2004254308 | 9/2004 |
| JP | 2004274220 | 9/2004 |
| JP | 2004282266 | 10/2004 |
| JP | 2004328667 | 11/2004 |
| WO | 0106803 | 1/2001 |

OTHER PUBLICATIONS

Japanese Office Action dated Nov. 24, 2010.
R. Pabst, et al., "Relay-Based Deployment Concepts for Wireless and Mobile Broadband Radio," IEEE Communications Magazine, vol. 42, Issue 9, Sep. 2004, pp. 80-89.
E. Zimmermann, et al., "On the Performance of Cooperative Diversity Protocols in Practical Wireless Systems," IEEE 58th Vehicular Technology Conference, vol. 4, Oct. 2003, pp. 2212-2216.

* cited by examiner

| MCS | RS-BS SNR | MS-RS DECISION THRESHOLD VALUE |
|---|---|---|
| 16QAM | SNR ≧ 10 dB | 10 dB |
| | 7 ≦ SNR < 10 dB | 15 dB |
| | SNR < 7 dB | CANCEL RELAY |
| QPSK | SNR ≧ 5 dB | 5 dB |
| | 2 ≦ SNR < 5 dB | 10 dB |
| | SNR < 2 dB | CANCEL RELAY |

FIG.6

COMMUNICATION SYSTEM, COMMUNICATION RELAY APPARATUS, AND COMMUNICATION RELAY METHOD

TECHNICAL FIELD

The present invention relates to a communication relay apparatus, a communication system that relays data between communication apparatuses using the communication relay apparatus, and a communication relay method used in the communication system.

BACKGROUND ART

In recent years, with spread of broadband communication services at home, also in a mobile communication system of a cellular scheme, research and development are actively conducted for the purpose of providing high-capacity data communication services. However, radio frequencies which are finite resources are running short, and it is actively studied to utilize high frequency bands and realize a high transmission rate in order to realize high-capacity data transmission.

When high frequency radio bands are utilized, a high transmission rate can be expected in a short distance, but attenuation due to a transmission distance is significant. Therefore, when high frequency radio bands are utilized in a real system, for example, the coverage area of a base station becomes small, and it is necessary to provide more base stations. Providing base stations requires significant costs, and therefore it is strongly desired to suppress an increase in the number of base stations and provide the above communication services.

Therefore, in order to make it possible even for the mobile station located outside a cellular service area to communicate with the base station, it is studied to realize communication between the mobile station located outside the cellular service area and the base station by making another mobile station (relay station) located between this mobile station and the base station relay the communication.

For example, there is a technique for determining a relay route by comprehensively judging a plurality of channel quality—channel quality from the mobile station located outside the service area to relay stations and channel quality from relay stations to the base station—and determining at the base station a relay station which actually performs a relay out of a plurality of relay stations, and transmitting control signals to the plurality of relay stations indicating whether or not to perform a relay (for example, refer to Patent Documents 1 and 2).

Patent Document 1: Japanese Patent Application Laid-Open No. HEI7-321722
Patent Document 2: Japanese Patent Application Laid-Open No. 2004-254308

DISCLOSURE OF INVENTION

Problems to be Solved by the Invention

However, with the above-described technique, a relay route is updated according to temporal fluctuation of a channel environment, that is, channel conditions. Therefore, the base station has to acquire both channel quality from the mobile station to relay stations and channel quality from the relay stations to the base station every time the relay route is updated, and there is a problem that, when channel quality changes fast over time, between the base station and the mobile station, quality reports are frequently transmitted, and control signals for route control are exchanged frequently, resulting in a decrease in data throughput of the communication system. Further, when channel quality changes faster than a frequency of route control, reception performance at a base station apparatus and the like substantially deteriorate, and, as a result, the data throughput of the communication system decreases.

It is therefore an object of the present invention to provide a communication system, communication relay apparatus and communication relay method that make it possible to relay communication without decreasing data throughput even when channel conditions change.

Means for Solving the Problem

The communication system of the present invention where a communication relay apparatus relays a communication data from a first communication apparatus to a second communication apparatus, adopts a configuration having: a first acquiring section that acquires a first channel condition between the first communication apparatus and the communication relay apparatus; a second acquiring section that acquires a second channel condition between the communication relay apparatus and the second communication apparatus; a setting section that sets a criterion for deciding whether or not the communication relay apparatus performs a relay, based on the second channel condition; and a deciding section that decides whether or not the communication relay apparatus performs a relay, based on the first channel condition and the criterion.

Advantageous Effect of the Invention

According to the present invention, it is possible to relay communication without decreasing throughput even when channel conditions change.

BRIEF DESCRIPTION OF DRAWINGS

FIG. 6 is a threshold value setting table for relay control according to Embodiment 1.

BEST MODE FOR CARRYING OUT THE INVENTION

Embodiments of the present invention will be described in detail below with reference to the accompanying drawings.

Embodiment 1

Figure 1:
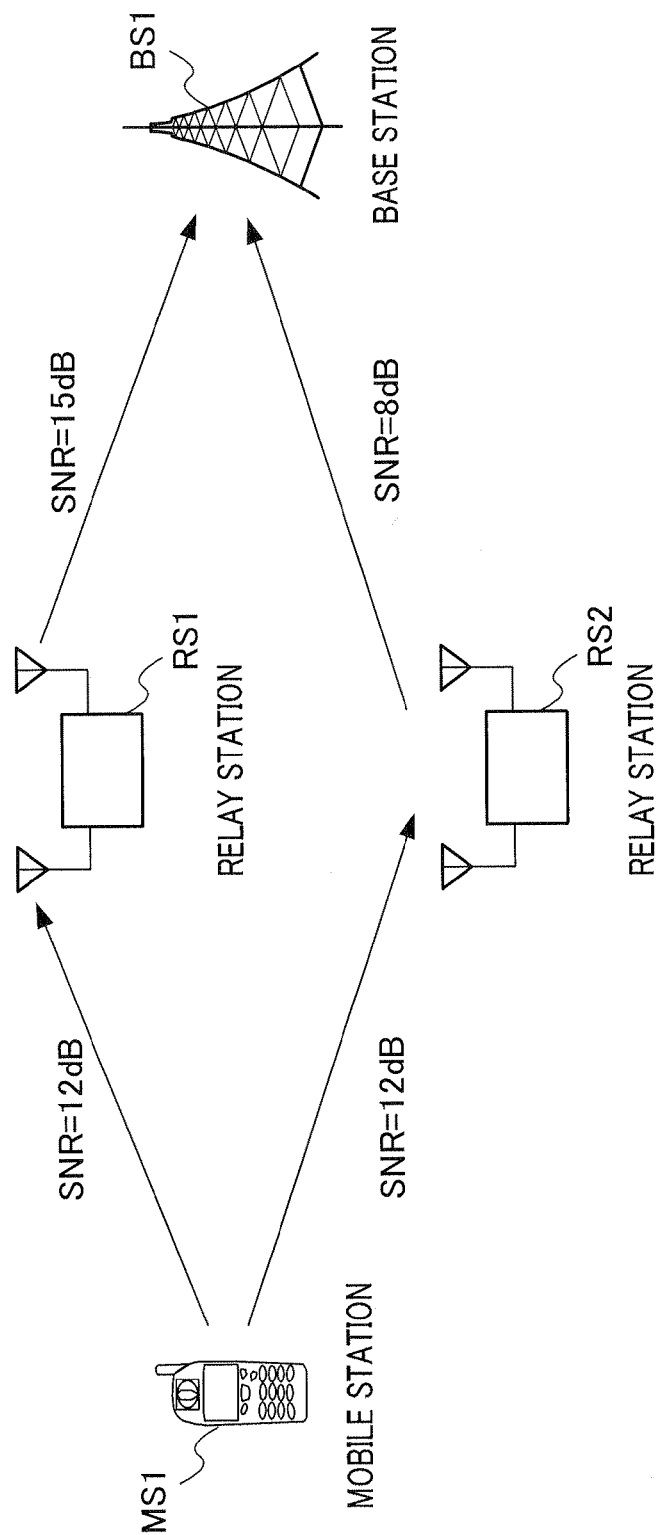
FIG. 1 shows an outline of a communication system according to Embodiment 1.

FIG. 1 shows an outline of a communication system according to Embodiment 1 of the present invention. A case will be described here as an example where mobile station MS1 requests to transmit signals to base station BS1, that is, uplink communication.

The communication system according to this embodiment includes mobile station MS1, relay stations RS1 and RS2, and base station BS1. Although mobile station MS1 requests to transmit signals to base station BS1, mobile station MS1 is outside the cellular service area, or the transmission power of mobile station MS1 is smaller than the transmission power of base station BS1, and therefore mobile station MS1 cannot directly transmit signals to base station BS1. Mobile station MS1 requests to relay transmission signals to relay stations RS1 and RS2 located between mobile station MS1 and base station BS1.

Figure 2:
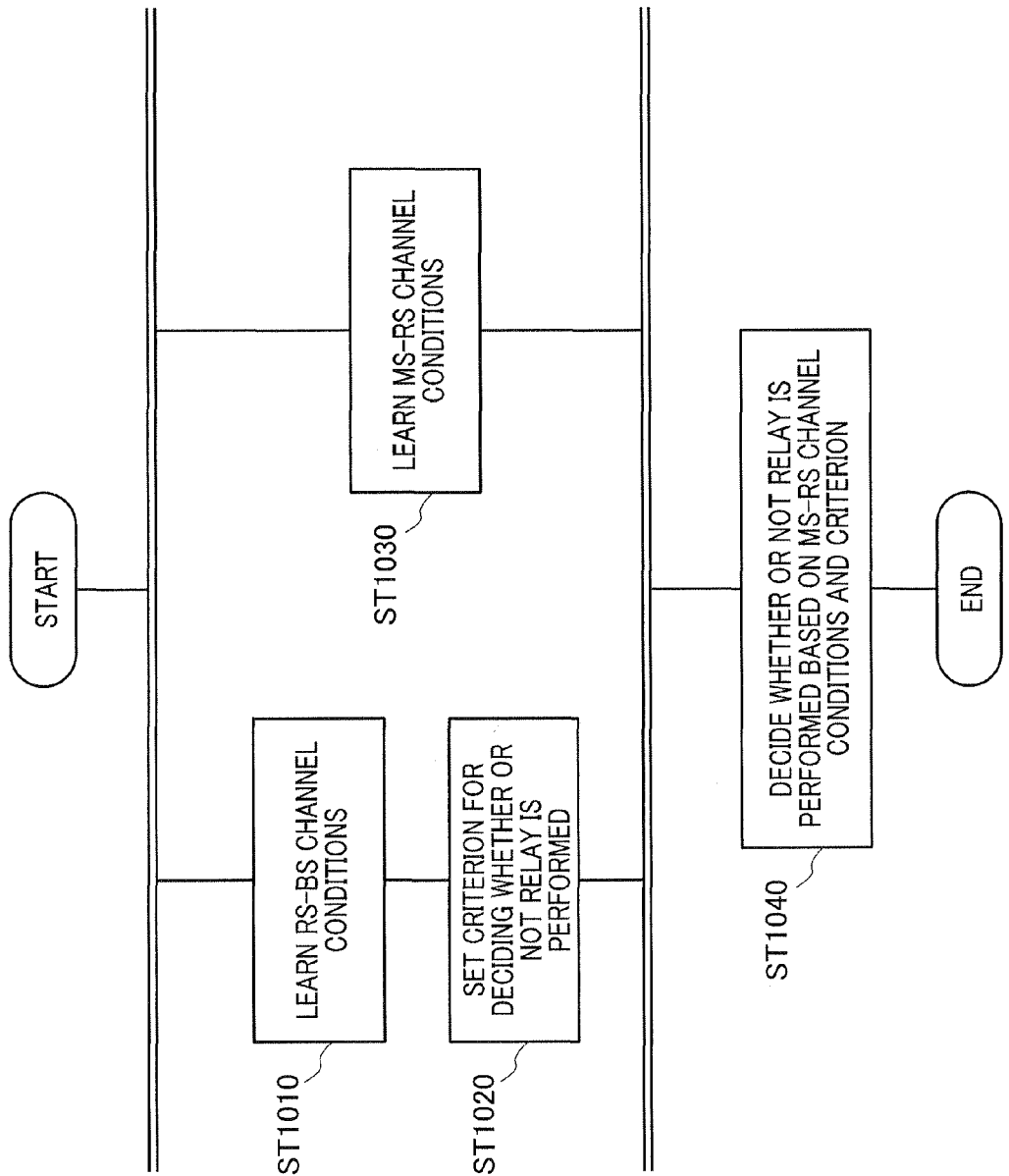
FIG. 2 is a flowchart illustrating steps of a communication relay method according to Embodiment 1.

FIG. 2 is a flowchart illustrating steps of a communication relay method of the communication system according to this embodiment in this case. For ease of explanation, the relay route when relay is performed via relay station RS1 is referred to as "route #1," and the relay route when relay is performed via relay station RS2 is referred to as "route #2."

In the communication system according to this embodiment, first, channel conditions between relay stations and a base station (between RS and BS) are learned (ST1010), a criterion used for deciding whether or not the relay station performs a relay, is set according to the channel conditions (ST1020). To be more specific, the communication system according to this embodiment sets a strict criterion for deciding whether or not to perform a relay for a relay route where the RS-BS channel conditions are poor, and sets a less strict criterion for a relay route where the RS-BS channel conditions are good.

On the other hand, in the communication system according to this embodiment, the channel conditions between the mobile station that requests a relay and the relay station—MS-RS channel conditions—are learned (ST1030). When the processing of both ST1020 and ST1030 is completed, in ST1040, the MS-RS channel conditions are compared with the criterion set in ST1020, and a final decision as to whether or not the relay stations perform a relay is made.

That is, in the communication system according to this embodiment, the relay stations autonomously decide whether or not to perform a relay according to surrounding channel conditions. An upper station such as a base station does not route a relay route from mobile station MS1 to base station BS1. Therefore, the step of deciding at the base station whether or not the relay stations perform a relay, and the step of indicating the decision results to the relay stations are removed, so that it is possible to perform relay processing faster.

Further, in the communication system according to this embodiment, a strict criterion is set for a relay route where the RS-BS channel conditions are poor. That is, when the RS-BS channel conditions are poor, it naturally follows that, even if a relay is performed using the relay route, it is less likely that the base station finally receives the relay signal without an error. Therefore, the communication system according to this embodiment decides whether or not to perform a relay (relay decision) using a strict criterion for this relay route from the beginning. By this means, even if the upper station such as a base station does not perform routing, a good relay route is selected automatically, thereby improving throughput of the communication system and selecting a relay route quickly.

Here, the channel conditions refer to channel quality such as the SNR (Signal to Noise Power Ratio) and BER (Bit Error Rate), or channel estimation values used for channel variation compensation. For example, in the example of FIG. 1, the MS-RS channel quality is SNR=12 dB in both routes #1 and #2. However, the RS-BS channel quality in route #1 is SNR=15 dB, while the RS-BS channel quality in route #2 is SNR=8 dB. Therefore, the communication system according to this embodiment sets a more strict criterion for deciding whether or not to perform a relay for route #2 than for route #1.

For example, in route #1, if the criterion is set so as to perform a relay when the MS-RS channel quality is equal to or higher than 10 dB, in route #2, the criterion is set so as not to perform a relay unless the MS-RS channel quality is equal to or higher than 15 dB. Therefore, in the example of FIG. 1, the communication system according to this embodiment performs a relay using route #1 alone.

In addition, in the example of FIG. 1, a case has been described where only the relay route via relay station RS1 satisfies the relay requirements of the communication system according to this embodiment and the relay is performed using this route, but, under other environments, the relay routes of both relay station RS1 and relay station RS2 may satisfy the relay requirements of the communication system according to this embodiment. At this time, in this embodiment, signals are transmitted via both relay routes. That is, there may be a plurality of relay routes. In this case, at base station BS1, received signals from the relay routes are combined, and reception performance further improves by spatial diversity gain.

Further, a case is described here as an example where there are a plurality of relay stations such as relay stations RS1 and RS2 between mobile station MS1 and base station BS1, but, even if there is one relay station, the communication relay method according to this embodiment operates. That is, in this case, when there is only one relay station and it is decided that a relay is not performed at the relay station, data communication of mobile station MS1 is not relayed in this communication system, and mobile station MS1 cannot communicate with base station BS1.

Further, a case is described here as an example where a source of requesting a relay (relay request station) is a mobile station, but the relay request station may be a mobile communication terminal such as a notebook personal computer.

Next, out of the communication apparatuses configuring the above-described communication system, the internal configurations and operations of relay station RS1 (RS2) and base station BS1 which are characteristic of the present invention will be described in detail. Here, a case will be described as an example where channel quality is used as a criterion indicating channel conditions.

Figure 3:
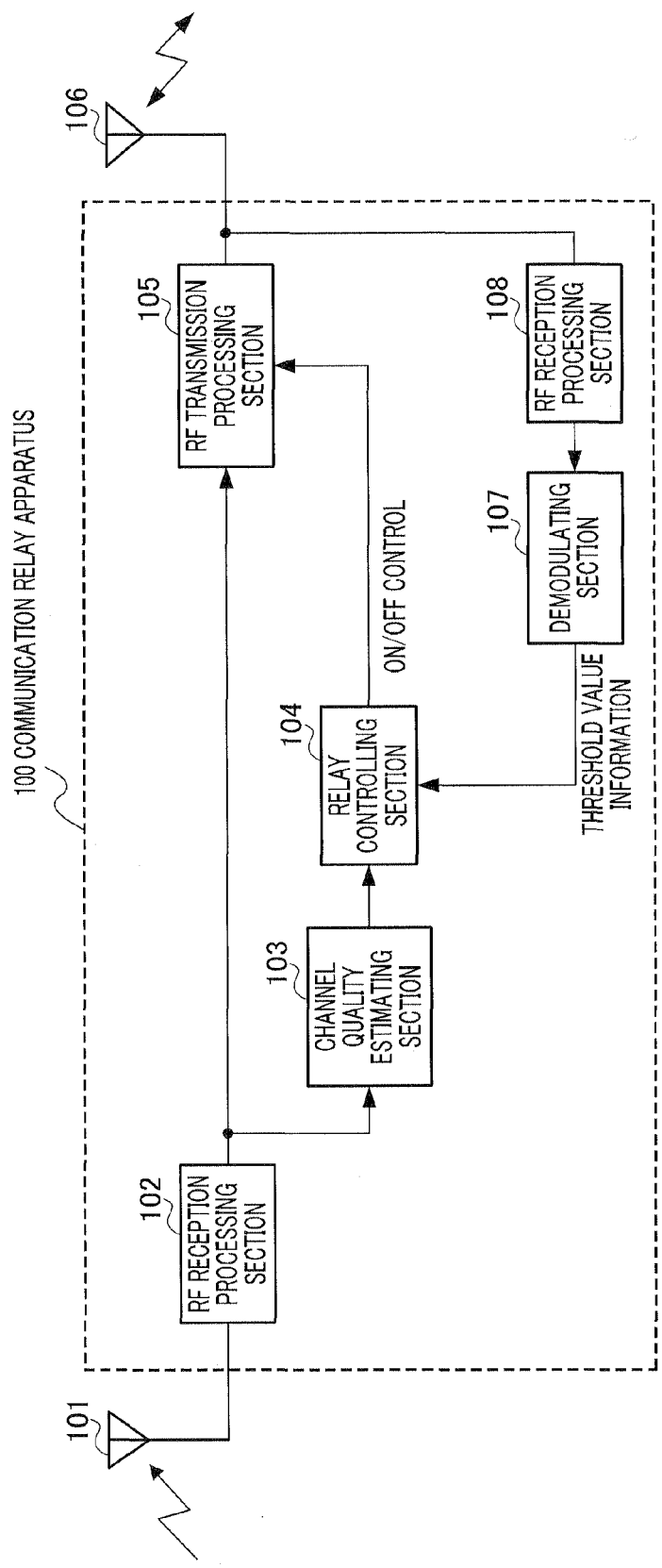
FIG. 3 is a block diagram showing a main configuration of a communication relay apparatus (relay station apparatus) according to Embodiment 1.

FIG. 3 is a block diagram showing an apparatus configuration of the above-described relay station RS1 (RS2) in detail, that is, a main configuration of communication relay apparatus (relay station apparatus) 100 according to this embodiment. Here, only a function that performs uplink relay processing will be described.

In this embodiment, open loop control may be applied where steps of deciding whether or not to perform a relay described in FIG. 2 are all performed at the relay station, or closed loop control may be applied where the steps are distributed and performed at the relay station and the base station. First, the case will be described where closed loop control is applied.

Communication relay apparatus 100 has antenna 101, RF reception processing section 102, channel quality estimating section 103, relay controlling section 104, RF transmission processing section 105, antenna 106, demodulating section 107 and RF reception processing section 108.

The sections of communication relay apparatus 100 perform the following operations.

RF reception processing section 102 performs processing necessary for a non-regenerative relay (amplify and forward) such as filtering and quadrature detection on signals received via antenna 101.

Here, a regenerative relay (decode and forward) refers to regenerating received bit streams, that is, the processing for converting binary data to real data. After received data is subjected to error correction processing, re-modulation processing is performed, and the relay data is transmitted. On the other hand, a non-regenerative relay refers to the processing of performing transmission after applying simple processing such as power amplification of the received signals without regenerating the received bit streams. That is, a non-regenerative relay performs processing only for a physical layer on the received signals and immediately shifts to transmission processing, so that it is possible to perform relay processing faster compared to the case of a regenerative relay by not performing processing for a non-physical layer such as an application layer.

Channel quality estimating section 103 estimates channel quality for the received signals which are from mobile station MS1 and outputted from RF reception processing section 102. By this channel quality estimation, channel quality estimating section 103 can learn the MS-RS channel quality. In addition, a channel quality estimation method will be described in detail later.

Relay controlling section 104 compares the channel quality outputted from channel quality estimating section 103 with a threshold value indicated from base station BS1, determines whether or not to perform a relay based on the comparison result, and outputs an ON/OFF control signal indicating whether or not to perform a relay, to RF transmission processing section 105.

RF transmission processing section 105 performs processing necessary for a non-regenerative relay such as quadrature modulation, power amplification and filtering processing, on the relay signals outputted from RF reception processing section 102, and transmits the relay signals via antenna 106.

RF reception processing section 108 performs predetermined radio reception processing such as filtering processing, down-conversion and A/D conversion on the received signals, and outputs the obtained signals to demodulating section 107.

Demodulating section 107 performs processing of extracting data from the received signals such as demodulation and decoding on the received signals. Out of demodulated received data, threshold value information for relay control use is outputted to relay controlling section 104.

Figure 4:
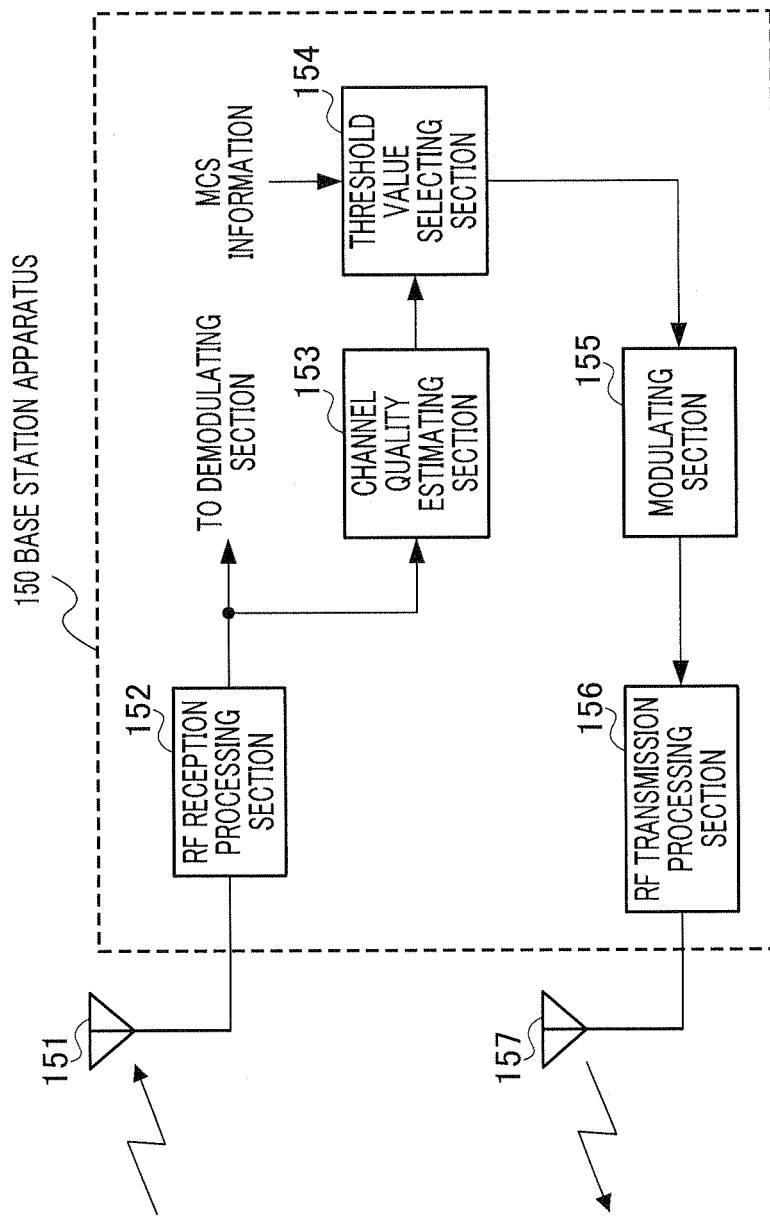
FIG. 4 is a block diagram showing a main configuration of a base station apparatus according to Embodiment 1.

FIG. 4 is a block diagram showing a main configuration of the above-described base station BS1, that is, base station apparatus 150 according to this embodiment. Here, only a function that performs uplink relay processing will be described.

Base station apparatus 150 is provided with antenna 151, RF reception processing section 152, channel quality estimating section 154, modulating section 155, RF transmission processing section 156 and antenna 157.

The sections of base station apparatus 150 perform the following operations.

RF reception processing section 152 performs predetermined radio reception processing such as filtering processing, down-conversion and A/D conversion on signals received via antenna 151, converts the signals to baseband signals, and outputs the baseband signals to a demodulating section (not shown) and channel quality estimating section 153.

Channel quality estimating section 153 estimates channel quality of the received signals from relay station RS1 (RS2). This channel quality estimation processing is the same processing as the channel quality estimation processing in channel quality estimating section 103 in communication relay apparatus 100. By this processing, channel quality estimating section 153 can learn the RS-BS channel quality.

Threshold value selecting section 154 determines a threshold value used for relay decision of communication relay apparatus 100 from information relating to uplink modulation parameters (MCS parameters) of the intended mobile station and the RS-BS channel quality estimation result outputted from channel quality estimating section 153. In an actual communication system, there are a plurality of communication relay apparatuses, and threshold value selecting section 154 sets a threshold value per communication relay apparatus.

Modulating section 155 performs predetermined modulation processing such as QPSK on information of the determined threshold value and outputs the information to RF transmission processing section 156.

RF transmission processing section 156 performs predetermined radio transmission processing such as D/A conversion, up-conversion, power amplification and filtering processing on transmission baseband signals transmitted from modulating section 155 and transmits the signals via antenna 157.

Figure 5:
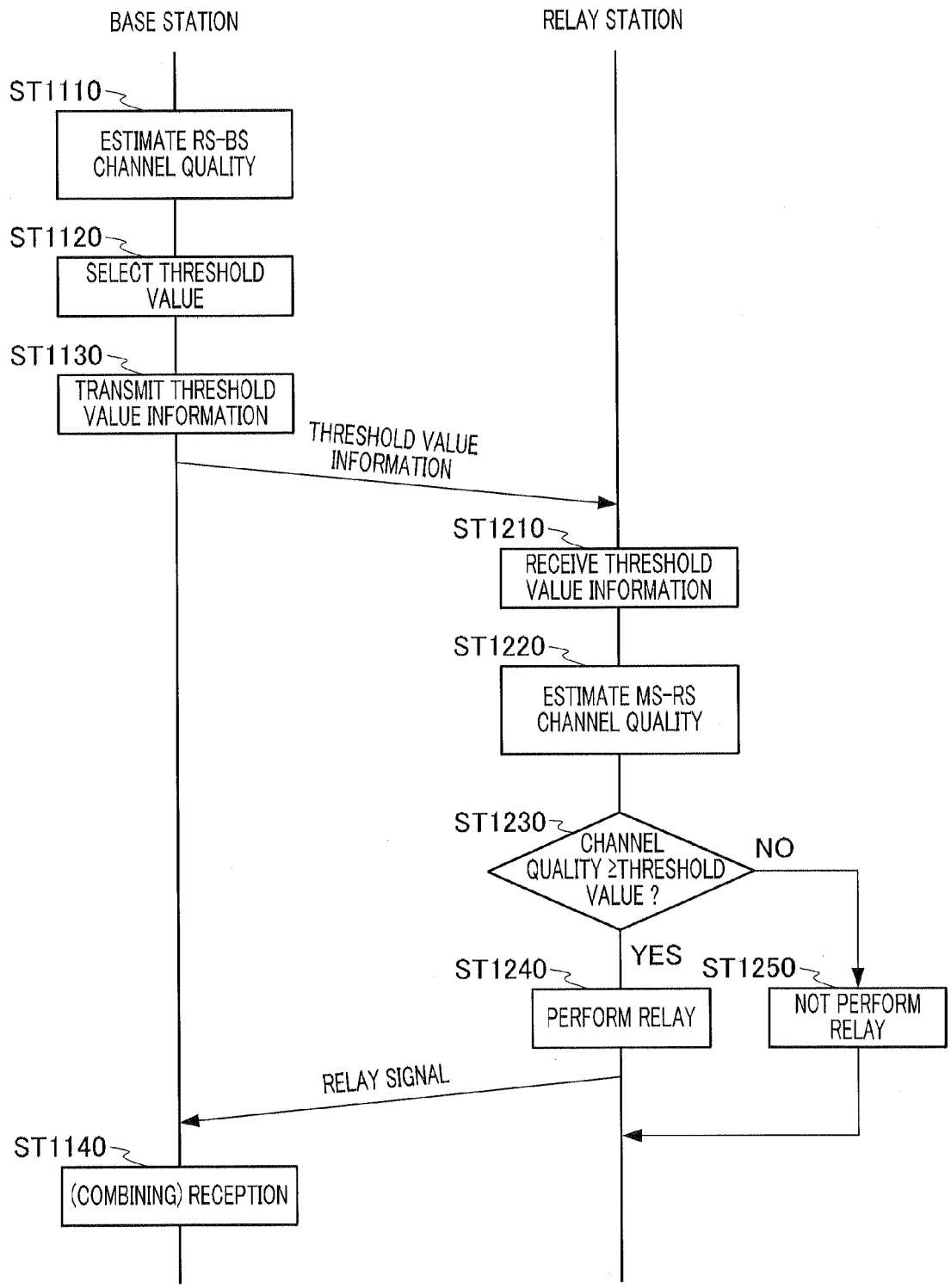
FIG. 5 is a sequence diagram for illustrating a series of operation of the communication system according to Embodiment 1.

FIG. 5 is a sequence diagram for illustrating a series of operation of the communication system configured with the above-described communication relay apparatus 100 and base station apparatus 150.

First, the base station estimates the RS-BS channel quality (ST1110). Based on this channel quality and information relating to uplink MCS parameters of the intended mobile station, a threshold value used for relay decision at the relay station is selected (ST1120). Information relating to this threshold value is transmitted to the relay station (ST1130). The relay station receives this threshold value information (ST1210). Further, the relay station estimates the MS-RS channel quality (ST1220) and compares the obtained channel quality with the threshold value obtained in ST1210 (ST1230). The relay station performs a relay when the channel quality is equal to or higher than the threshold value (ST1240), and the base station receives relay signals (ST1140). When there are a plurality of relay stations, combining reception is performed in ST1140. On the other hand, in ST1230, when the channel quality is lower than the threshold value, the relay station does not perform a relay (ST1250).

In this way, in this embodiment, a threshold value for deciding whether the relay station performs or cancels a relay (a threshold value which is compared with the MS-RS received signal quality for deciding the relay) is determined based on the RS-BS channel quality. When the RS-BS channel quality conditions are good, a lower threshold value is set for deciding the MS-RS quality. That is, when the RS-BS channel quality conditions are good, it is decided to perform a relay even if the MS-RS channel quality is slightly poor. On the other hand, when the RS-BS channel quality conditions are poor, a high threshold value is set for relay decision based on the MS-RS channel quality. Each relay station decides whether or not to perform a relay based on this set threshold value.

By this means, a relay route is adaptively switched according to instant quality of each relay route, so that it is possible to respond to fast fluctuation of transmission characteristics. Further, non-regenerative relay signals having poor quality are less likely to be generated, and the receiving apparatus such as base station BS1 can utilize spatial diversity gain, so that reception performance improve, and overall throughput of the communication system improves.

Next, the threshold value selection processing in ST1120 will be described in detail.

FIG. 6 is a table showing a criterion used to decide whether or not to perform a relay based on MCS parameters, that is, a threshold setting table for relay control use. A case will be described as an example where an SNR is used as channel quality.

In this table, a decision threshold value used at relay controlling section 104 of communication relay apparatus 100 is set per required quality of each MCS parameter according to the degree of the RS-BS SNR. An MCS parameter is already selected apart from the MS-RS and RS-BS channel quality measurement values. Threshold value selecting section 154 receives the estimation SNR value outputted from channel quality estimating section 153 and an MCS parameter (for example, 16QAM) for relay request station MS1, and selects a threshold value for relay decision use used at relay station RS1 (RS2) according to this threshold value setting table.

If relay is decided using the threshold value set based on this table, for example, when the RS-BS SNR is good, a low decision threshold value is set between MS and RS, and relay is decided less strictly. On the other hand, when the RS-BS SNR is poor, a high decision threshold value is set between MS and RS, and relay is decided strictly. At the same time, signals from mobile station MS1 satisfy the required quality of an MCS. For example, when the MCS is 16QAM and the RS-BS estimation SNR is 15 dB, the decision threshold value is set at 10 dB. Furthermore, when the MCS is 16QAM and the RS-BS estimation SNR is 8 dB, the decision threshold value is determined 15 dB. When the MCS is QPSK, the MS-RS decision threshold value is determined in the same way according to the RS-BS SNR.

Further, when the RS-BS SNR does not satisfy the required quality of the MCS, the MS-RS decision threshold value is set infinite, or the like, and set so that the relay is not practically performed. It is also possible to output from the beginning a control signal indicating relay cancellation.

In this way, in this embodiment, the above-described threshold value is determined based on the required quality of the MCS parameter as well as the RS-BS channel quality. Therefore, the threshold value suitable for the MCS parameter can be determined, so that it is possible to perform more appropriate relay control and improve throughput of the communication system.

Further, by performing the above operations at the relay stations so as to correspond to the mobile station independently, it is possible to perform dispersed relay control corresponding to mobile stations at one relay station, so that it is possible to improve throughput of the communication system.

Further, when a relay station is fixed or a mobile station having a slow moving speed operates as a relay station, the RS-BS channel quality changes sufficiently slowly compared to the MS-RS channel quality. Therefore, it is possible to keep a large interval for reporting a threshold value from base station BS1 to relay station RS1 (RS2), so that an overhead of signaling can be reduced.

Figure 7:
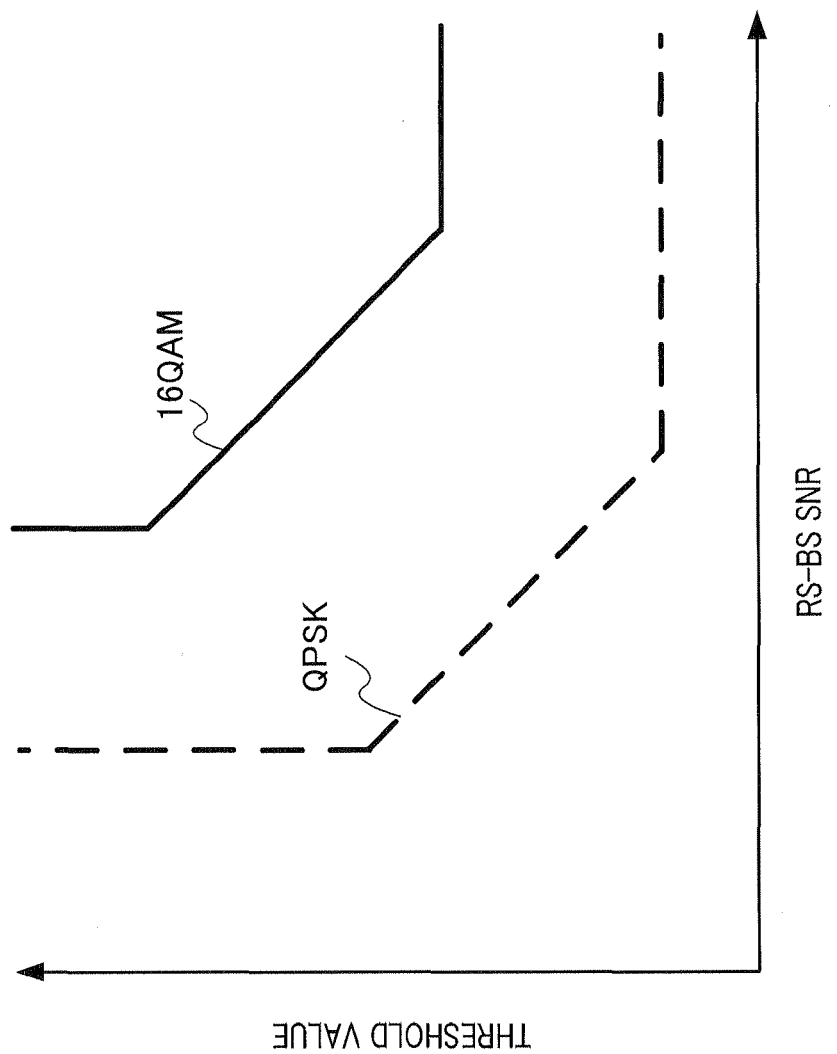
FIG. 7 is a threshold value setting curve for relay control according to Embodiment 1.

It is also possible to determine a threshold value using the threshold value setting curve as shown in FIG. 7, for example, instead of the table shown in FIG. 6. This curve shows characteristics where, on a per MCS parameter basis, the threshold value becomes larger for a smaller RS-BS SNR value and the threshold value becomes smaller for a larger RS-BS SNR value, and can be expressed by the function in the following equation.

Threshold value=$f$(MCS parameter,RS-BS SNR)

Figure 8:
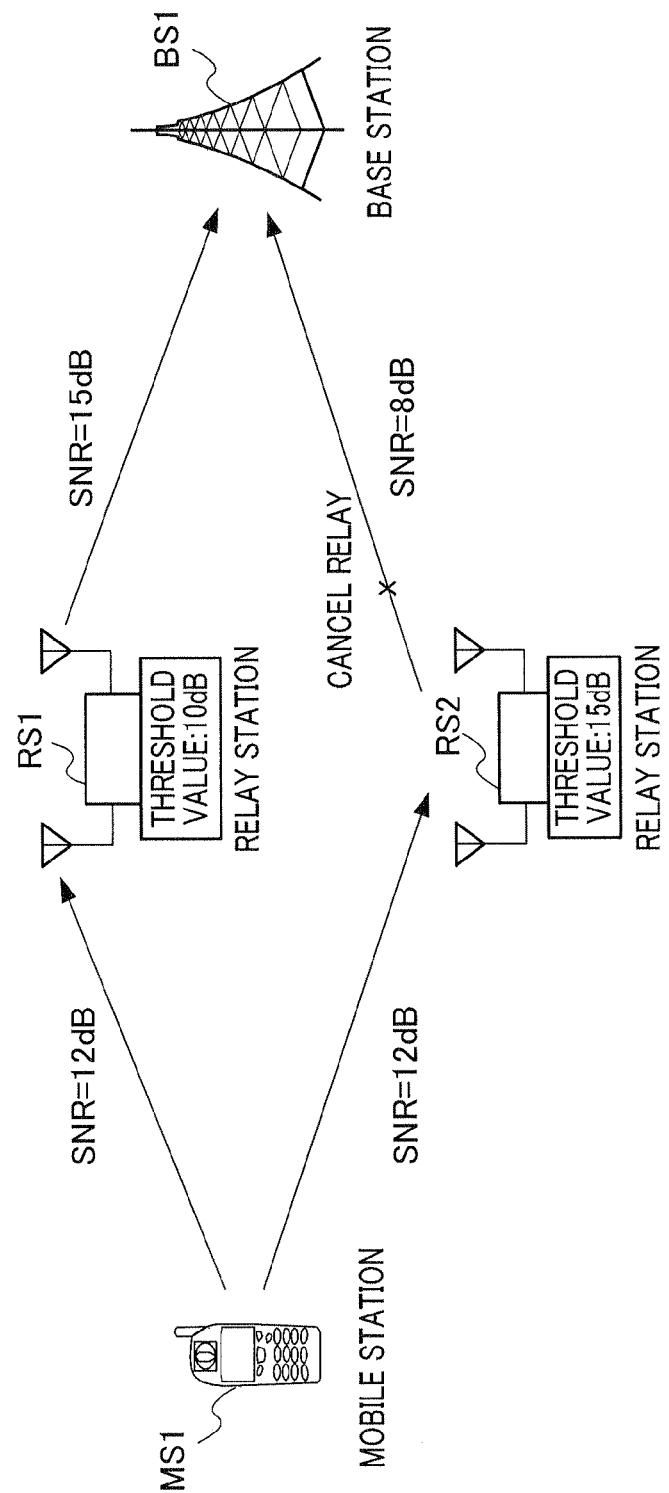
FIG. 8 shows a specific example of the communication relay method according to Embodiment 1.

FIG. 8 shows a specific example of the communication relay method according to this embodiment. The basic conditions are the same as in FIG. 1.

In the example of this figure, when the MCS used for modulating data transmitted by mobile station MS1 is set at 16QAM, the RS-BS estimation SNR of route #1 is 15 dB, and therefore the MS-RS decision threshold value is determined 10 dB according to the threshold value setting table shown in FIG. 6. On the other hand, when the RS-BS estimation SNR of route #2 is 8 dB, the decision threshold value is determined 15 dB. Therefore, when the MS-RS SNRs of route #1 and route #2 are 12 dB, the SNR of route #1 is equal to or higher than the threshold value, and a relay is performed, but the SNR of route #2 is lower than the threshold value, and therefore a relay is not performed, and the relay is cancelled.

For example, when the MCS is QPSK, the MS-RS decision threshold value is determined in the same way as described above according to the RS-BS SNR with reference to the threshold value setting table of FIG. 6.

Next, the SNR estimation method will be described.

First, channel quality estimating section 153 of base station apparatus 150 estimates the RS-BS SIR from pilot symbols, data symbols, and the like included in the signals transmitted from the relay station. As an SNR estimation method, when N pilot symbols $p_n$ (n=1, 2, ..., N) are consecutively transmitted before the received data symbols, channel response of a transmission path is estimated from an average value of the results of complex multiplying by pilot symbols in the base station according to the following equation 1.

(Equation 1)

$$\tilde{h} = \frac{1}{N} \sum_{n=1}^{N} r_n p_n^* \quad [1]$$

In addition, $r_n$ is calculated from the following equation 2.

(Equation 2)

$$r_n = p_n h + n_n \quad [2]$$

Further, N is the total number of pilot symbols, $p_n$ is the n-th pilot symbol, $r_n$ is the n-th received pilot symbol, h is the channel response of the actual transmission path, and $n_n$ is the additive Gaussian noise upon reception of the n-th pilot symbol.

Here, it is assumed that $p_n$ satisfies the following equation 3 and the variation of channel response is significantly small with respect to the length of N consecutive pilot symbols.

(Equation 3)

$$|p_n|^2 = 1 \quad [3]$$

Equation 1 becomes the following equation 4.

(Equation 4)

$$\begin{aligned} h &= \frac{1}{N}\sum_{n=1}^{N} r_n p_n^* \\ &= \frac{1}{N}\sum_{n=1}^{N}(p_n h + n_n)p_n^* \\ &= \frac{1}{N}\sum_{n=1}^{N} h + \frac{1}{N}\sum_{n=1}^{N} n_n p_n^* \end{aligned} \quad [4]$$

When the number of pilot symbols N to be averaged is significantly large, the following equation 5 is satisfied.

(Equation 5)

$$\frac{1}{N}\sum_{n=1}^{N} n_n p_n^* \approx 0 \quad [5]$$

(Equation 6)

$$\tilde{h} \approx h \quad [6]$$

Accordingly, S, calculated from the following equation 7, is used as received signal power.

(Equation 7)

$$S = |\tilde{h}|^2 \quad [7]$$

Further, noise power can be estimated from the following equation 8 for the received pilot symbols.

(Equation 8)

$$\begin{aligned} N &= \frac{1}{N}\sum_{n=1}^{N}\left(r_n \tilde{h}^* / |\tilde{h}|^2 - p_n\right) \\ &= \frac{1}{N}\sum_{n=1}^{N}\left\{(p_n h + n_n)\tilde{h}^* / |\tilde{h}|^2 - p_n\right\} \\ &\approx \frac{1}{N}\sum_{n=1}^{N} n_n \tilde{h}^* / |\tilde{h}|^2 \end{aligned} \quad [8]$$

Accordingly, the estimation SNR [dB] of the received signals is as expressed in the following equation 9.

(Equation 9)

$$SNR = 10 * \log_{10}\left(\frac{|\tilde{h}|^2}{\frac{1}{N}\sum_{n=1}^{N} n_n \tilde{h}^* |\tilde{h}|^2}\right) \quad [9]$$

Although the SNR estimation method using pilot symbols has been described as an example, this is by no means limiting, and other methods may also be used.

Figure 9:
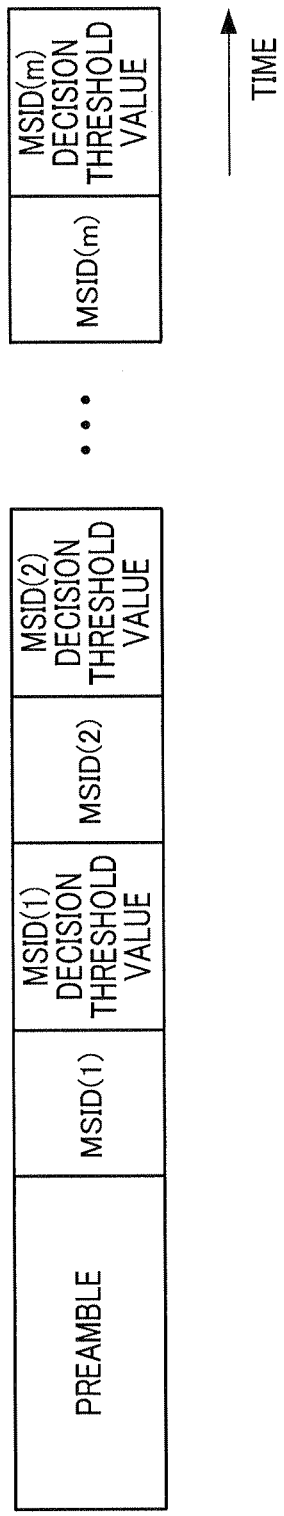
FIG. 9 shows an example of a frame format according to Embodiment 1.

Transmission of threshold value information in ST1130 is performed by transmitting the information as packets per relay station using a frame format signal as shown in FIG. 9, for example. In this figure, an MSID stores a bit indicating ID for identifying mobile stations, and a decision threshold value stores a bit indicating a relay control threshold value of a mobile station corresponding to the MSID.

When decision threshold values are transmitted to a plurality of mobile stations, MSIDs and decision threshold values corresponding to a plurality of mobile stations are collectively transmitted as shown in FIG. 9. By this means, it is possible to make the overhead for threshold value reporting smaller.

Figure 10:
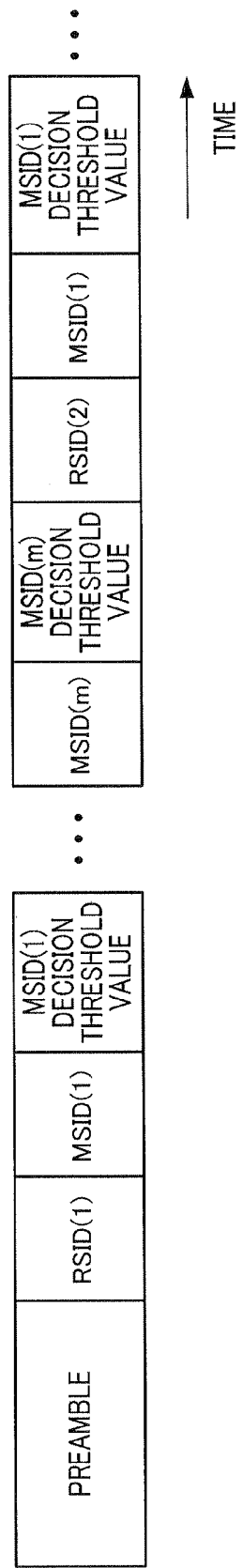
FIG. 10 shows another example of a frame format according to Embodiment 1.

Furthermore, as shown in FIG. 10, it is also possible to adopt a configuration where, after ID (RSID) for identifying relay stations (RS), bits indicating decision threshold values of mobile station corresponding to the relay stations are arranged, and threshold values are collectively reported to a plurality of relay stations in one frame.

The communication relay apparatus receives signals of these transmission frames including threshold value information from the base station, extracts a plurality of threshold values corresponding to the mobile stations, stores these threshold values in an internal memory, and uses the threshold values for relay decision accordingly.

As described above, according to this embodiment, it is possible to relay communication data from MS without decreasing throughput even when channel conditions change.

Figure 11:
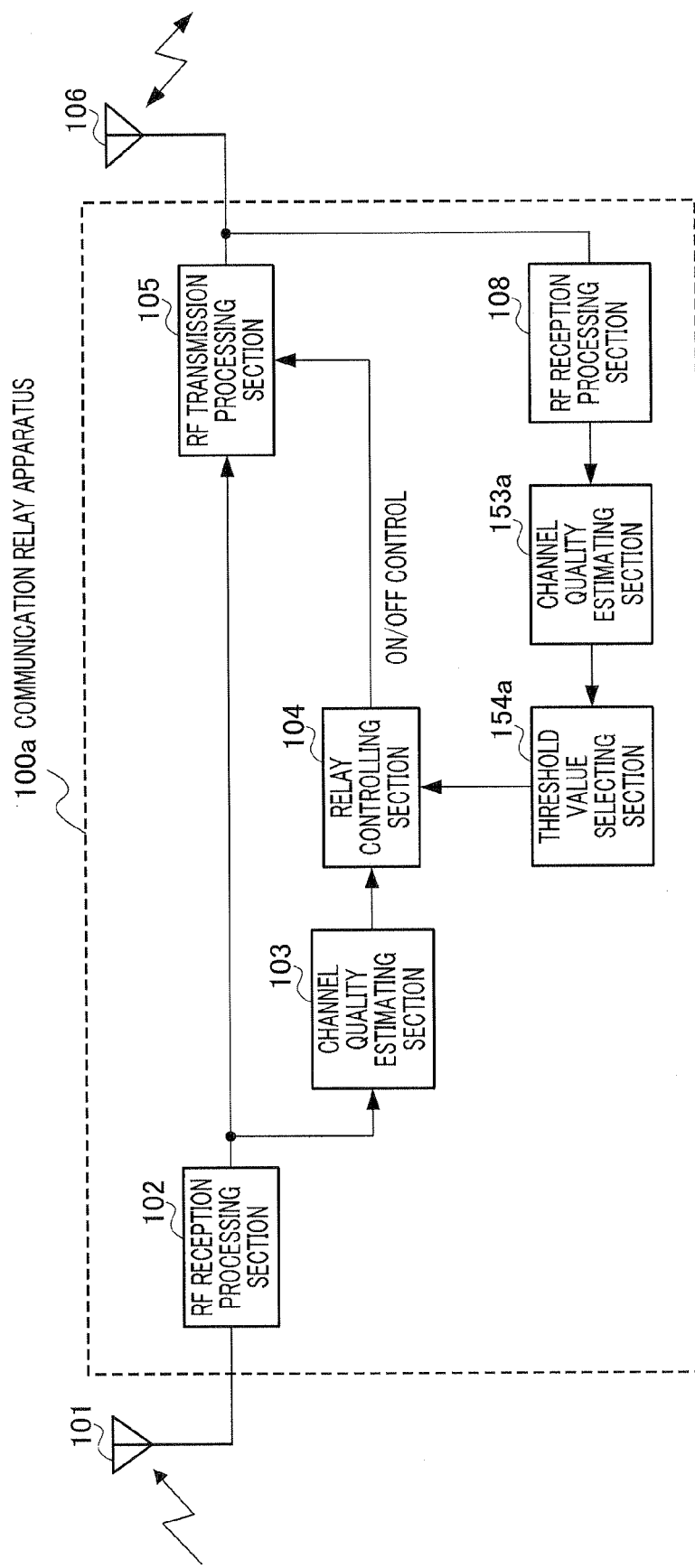
FIG. 11 is a block diagram showing a main configuration of the communication relay apparatus according to Embodiment 1 when open-loop control is adopted.

In addition, in the example of communication relay apparatus 100 and base station apparatus 150, a case of closed loop control has been described as an example where decision as to whether or not to perform a relay is distributed and made at the relay station and the base station, but it is also possible to apply open loop control where channel quality estimation and threshold value selection are all performed at the communication relay apparatus. This is particularly effective in communication systems such as TDD (Time Division Duplex). FIG. 11 is a block diagram showing a main configuration of communication relay apparatus 100a when open loop control is applied to relay decision. As shown in this figure, channel estimating section 153 and threshold value selecting section 154 which are provided in base station apparatus 150 (refer to FIG. 4) are provided in communication relay apparatus 100a as channel quality estimating section 153a and threshold value selecting section 154a.

Figure 12:
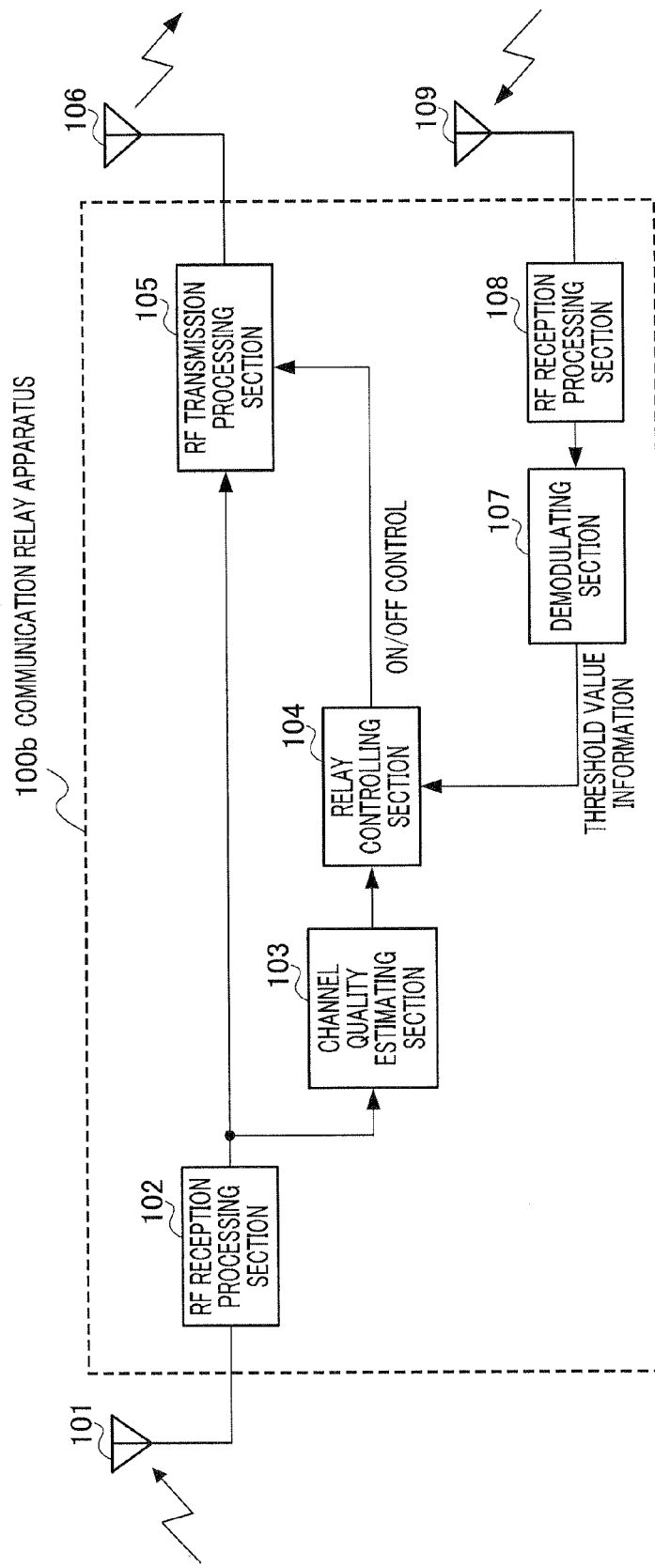
FIG. 12 is a block diagram showing a main configuration of the communication relay apparatus according to Embodiment 1 when different antennas are used for transmission and reception.

Further, in the example of communication relay apparatus 100, a case has been described as an example where RS-BS communication is performed using transmitting/receiving antenna 106, but it is also possible to perform transmission and reception using a transmitting antenna and a receiving antenna, respectively. FIG. 12 is a block diagram showing a main configuration of communication relay apparatus 100b in this case. Communication relay apparatus 100b has transmitting antenna 106 and receiving antenna 109. By adopting this configuration, communication relay apparatus 100b can perform transmission and reception at the same timing.

Further, in this embodiment, a case of uplink relay has been described as an example, but, this embodiment is also applicable to the case of downlink relay, that is, a case where signals are transmitted from the base station to the mobile station.

Embodiment 2

The communication system according to this embodiment adopts a multiplexing access scheme such as TDM (Time Division Multiplexing), FDM (Frequency Division Multiplexing), CDM (Code Division Multiplexing) and SDM (Space Division Multiplexing), and performs a relay decision described in Embodiment 1 per subcarrier.

Figure 13:
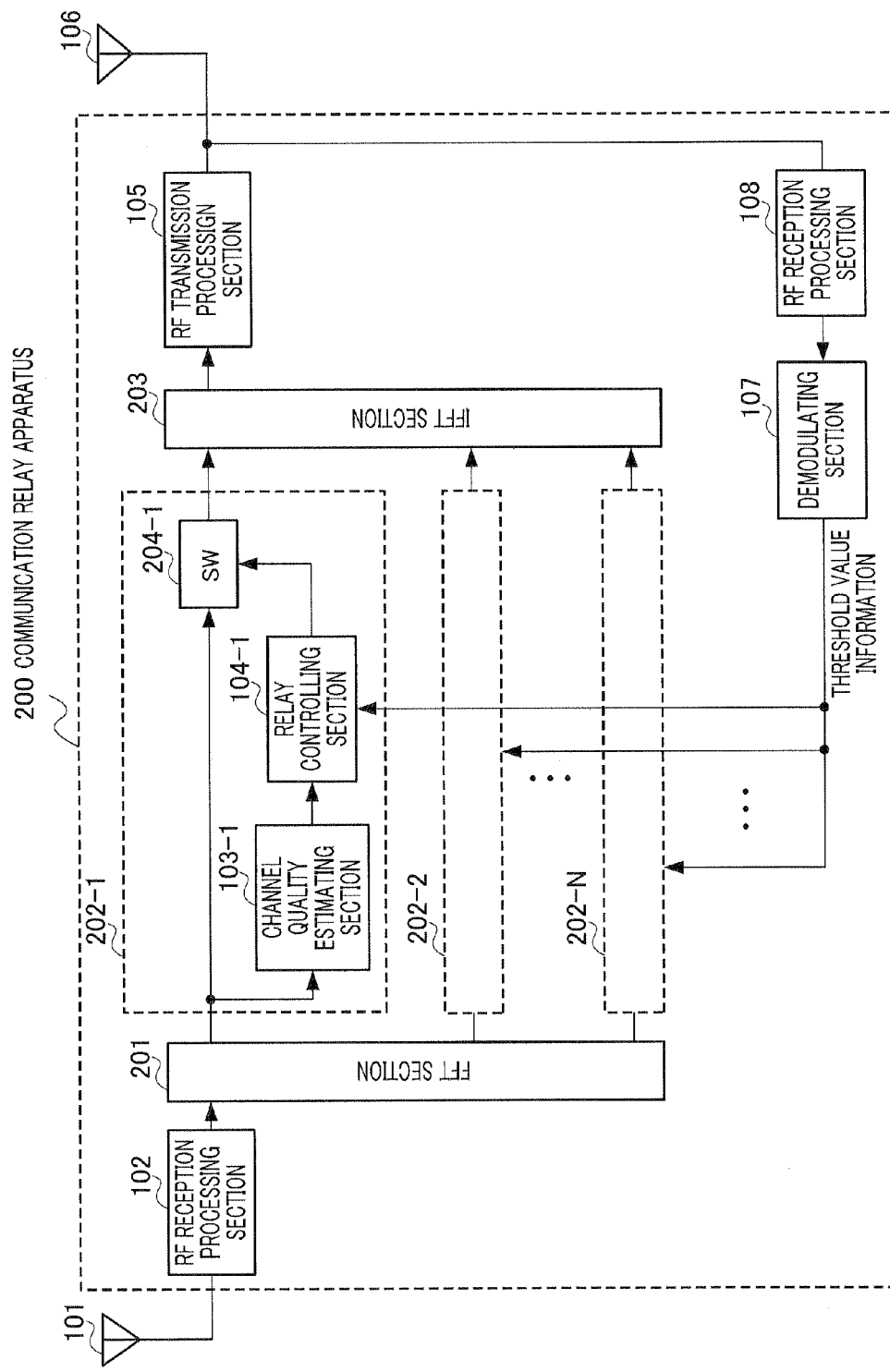
FIG. 13 is a block diagram showing a main configuration of a communication relay apparatus according to Embodiment 2.

FIG. 13 is a block diagram showing a main configuration of communication relay apparatus 200 according to Embodiment 2 of the present invention. Here, a case will be described as an example where the communication system according to this embodiment adopts an FDM (FDMA) scheme as a multiplexing scheme, and an OFDM scheme as a transmission scheme. Therefore, the communication system according to this embodiment decides a relay per subcarrier.

In addition, communication relay apparatus 200 has a similar basic configuration to communication relay apparatus 100 described in Embodiment 1, and the same components will be assigned the same reference numerals without further explanations.

Communication relay apparatus 200 adopts an OFDM scheme as a transmission scheme and has FFT section 201 that transforms time domain signals to frequency domain signals and IFFT section 203 that transforms frequency domain signals back to time domain signals. Further, communication relay apparatus 200 decides a relay per subcarrier and has processing systems 202-1 to 202-N corresponding to subcarriers. Each processing system has a channel quality estimating section, relay controlling section and switch. For example, processing system 202-1 has channel quality estimating section 103-1, relay controlling section 104-1 and switch 204-1.

Communication relay apparatus 200 performs error decision on data bit streams obtained by performing demodulation processing and decoding processing on the received relay signals, and performs a regenerative relay on subcarriers decided not to include an error, and performs a relay by switching to a non-regenerative relay on subcarriers decided to include an error.

Figure 14:
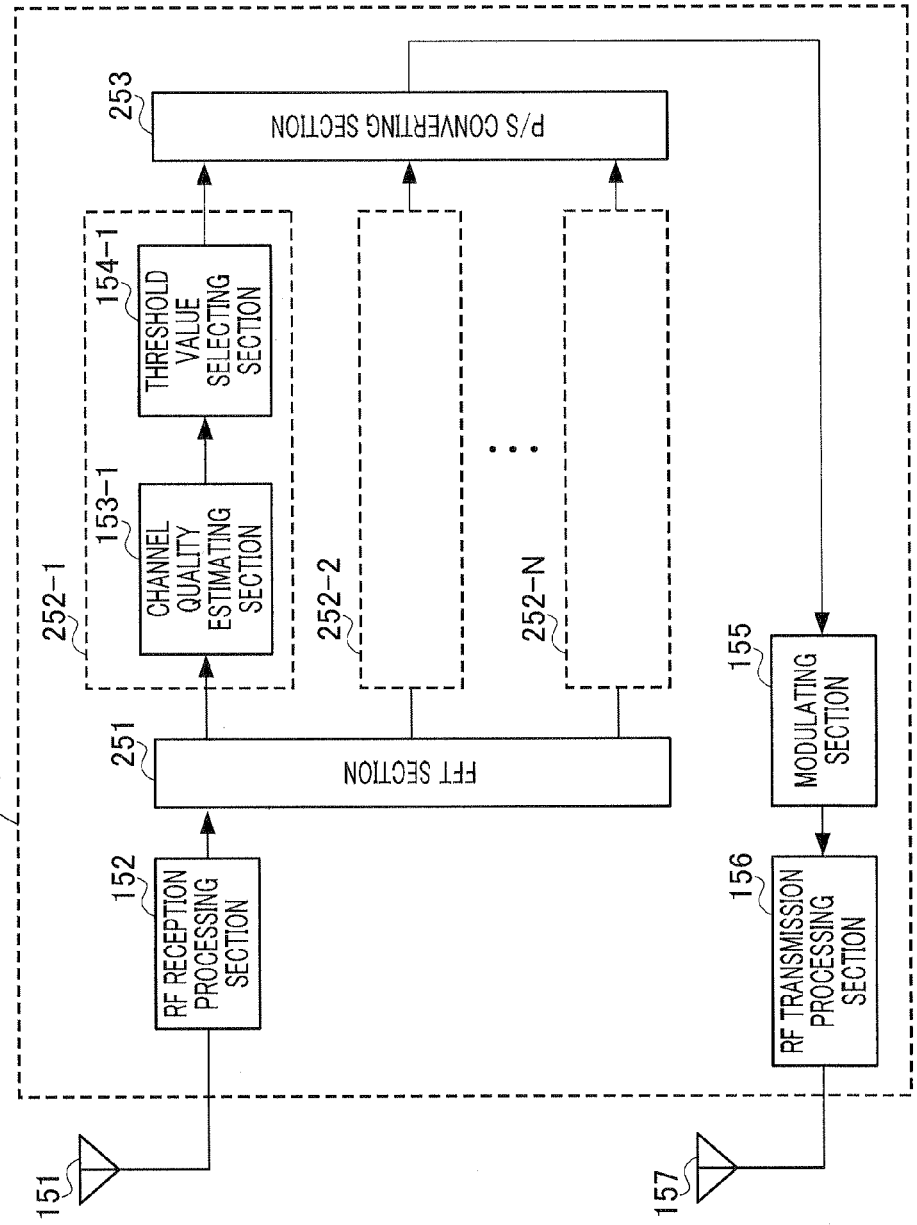
FIG. 14 is a block diagram showing a main configuration of a base station apparatus according to Embodiment 2.

FIG. 14 is a block diagram showing a main configuration of base station apparatus 250 according to this embodiment.

Base station apparatus 250 also has a similar basic configuration to base station apparatus 150 (refer to FIG. 4) described in Embodiment 1, and therefore the same components will be assigned the same reference numerals without further explanations.

As described above, the communication system according to this embodiment decides a relay per subcarrier, and base station apparatus 250 has processing systems 252-1 to 252-N corresponding to subcarriers, FFT section 251 and P/S converting section 253. Each processing system has a channel quality estimating section and threshold value selecting section. For example, processing system 252-1 has channel quality estimating section 153-1 and threshold value selecting section 154-1.

Figure 15:
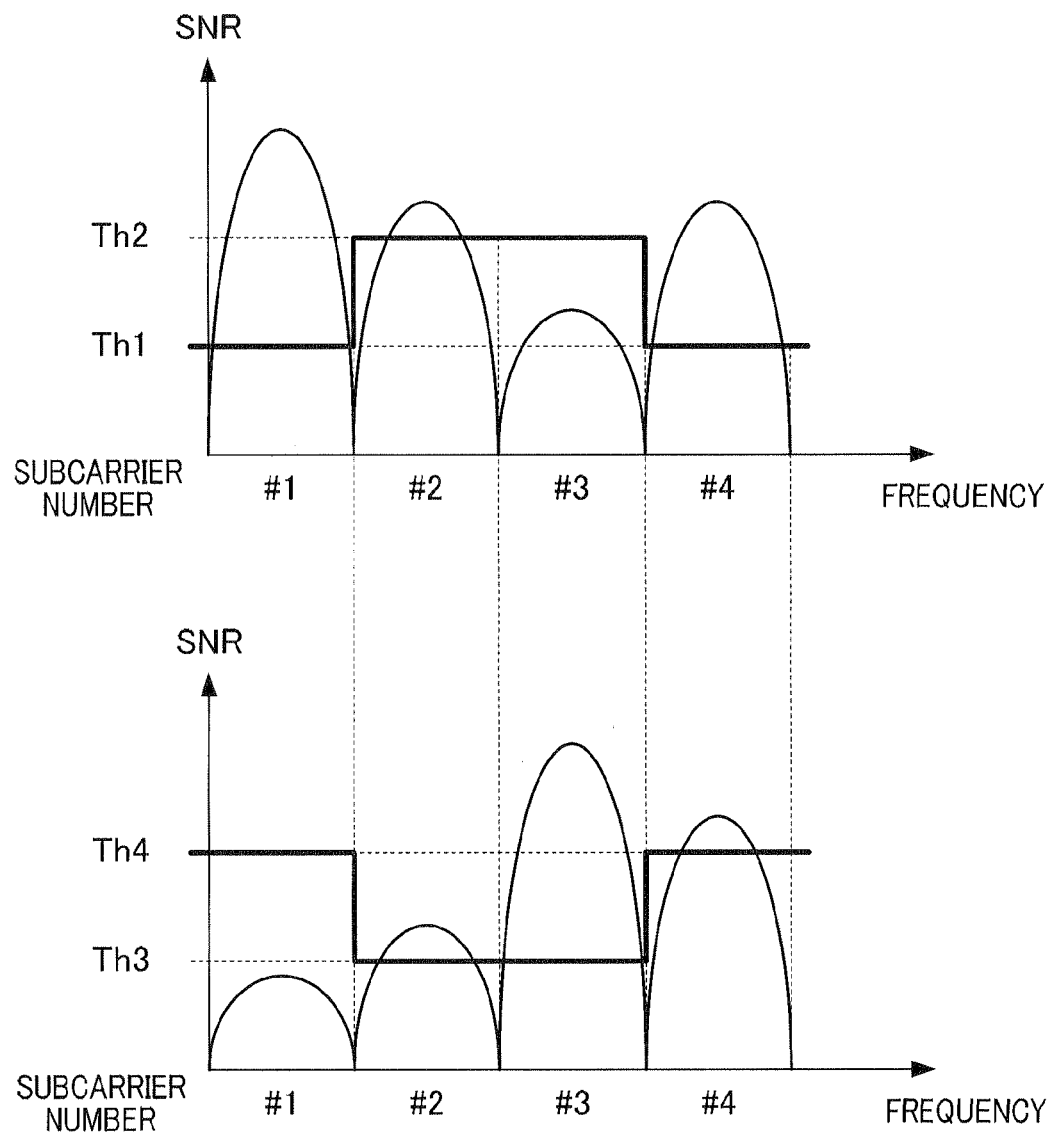
FIG. 15 shows how relay decision according to Embodiment 2 is performed.

FIG. 15 shows how relay decision according to this embodiment is specifically performed based on received quality of subcarriers. Here, the upper part of FIG. 15 shows subcarriers in route #1 and the lower part of FIG. 15 shows subcarriers in route #2.

For example, as shown in the upper part of FIG. 15, in route #1, threshold value Th1 is set for subcarriers #1 and #4, and a different threshold value, Th2 is set for subcarriers #2 and #3. Further, as shown in the lower part of FIG. 15, in route #2, threshold value Th4 is set for subcarriers #1 and #4, and threshold value Th3 is set for subcarriers #2 and #3. That is, different threshold values are set according to subcarriers (frequency bands). In route #1, subcarrier #3 does not have an SNR equal to or higher than the threshold value, and therefore subcarrier #3 is removed from relay targets. In route #2, subcarrier #1 does not have an SNR equal to or higher than the threshold value, and therefore subcarrier #1 is removed from relay targets.

In this way, according to this embodiment, a threshold value for deciding a relay is determined per subchannel based on required quality of the applied modulation parameter, and therefore, even under the environment where channel quality is different for each subchannel, a relay is controlled according to quality for each subchannel, and non-regenerative relay signals having poor quality are less likely to be transmitted, so that it is possible to improve reception performance at a receiving apparatus such as a base station. Particularly, even under a frequency selective fading environment, it is possible to perform relay control according to quality of each subchannel.

In this embodiment, a case has been described as an example where relay is decided per subchannel, but relay may be decided per subcarrier group which is comprised of a plurality of subcarriers.

Further, in this embodiment, a case has been described as an example where subchannels are subcarriers of an OFDM scheme, but this is by no means limiting, and, for example, when a multiplexing scheme is an SDM (SDMA) scheme, subchannels may be substreams, or, when a multiplexing scheme is a CDM (CDMA) scheme, subchannels may be spreading codes, or when a multiplexing scheme is a TDM (TDMA) scheme, subchannels may be time frames or time slots.

The embodiments of the present invention have been described.

The communication system, communication relay apparatus and communication relay method according to the present invention are not limited to the above embodiments, and can also be implemented and modified in various ways. For example, the above embodiments can be appropriately combined and implemented.

It is possible to provide the communication relay apparatus according to the present invention to a mobile station apparatus and the like in a mobile communication system, and it is thereby possible to provide a mobile station apparatus and the like having the same operation effects as described above.

Here, a case has been described as an example where the SNR is used as channel quality estimated at channel quality estimating sections 103 and 153, that is, an index indicating channel conditions, but the CNR (Carrier to Noise Ratio), reception power, RSSI (Received Signal Strength Indicator), reception amplitude, and the like may be used instead of the SNR. Further, in a communication system such as a cellular system, where interference power as well as noise power is important as channel quality information, the SIR (Signal to Interference Ratio), CIR (Carrier to Interference Ratio), SINR (Signal to Interference and Noise Ratio), CINR (Carrier to Interference and Noise Ratio), and the like may be used as an index indicating the channel conditions. Furthermore, the number of loading bits, transmission power or a control value such as complex transmission weight coefficients calculated from values indicated in the above-described index may be used as an index indicating the channel conditions. When a MIMO (Multi-Input Multi-Output) scheme is adopted, a matrix or a value such as a singular value and eigenvalue obtained through singular value decomposition, eigenvalue decomposition or QR decomposition, may be used as an index indicating the channel conditions.

Also, in the above embodiments, a case has been described as an example where the present invention is configured by hardware. However, the present invention can also be realized by software. For example, it is possible to implement the same functions as in the communication relay apparatus of the present invention by describing algorithms of the communication relay method according to the present invention using the programming language, and executing this program with an information processing section by storing in a memory.

Each function block employed in the description of each of the above embodiments may typically be implemented as an LSI constituted by an integrated circuit. These may be individual chips or partially or totally contained on a single chip. "LSI" is adopted here, but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-095343, filed on Mar. 29, 2005, the entire content of which is expressly incorporated by reference herein.

INDUSTRIAL APPLICABILITY

The communication relay apparatus and communication relay method according to the present invention can be applied to mobile station apparatuses and other apparatuses in a mobile communication system.

The invention claimed is:

1. A communication relay apparatus configured to relay a signal from a first communication apparatus to a second communication apparatus, the communication relay apparatus comprising:
   a first acquiring section configured to acquire a first channel condition between the first communication apparatus and the communication relay apparatus;
   a receiver configured to receive a threshold value changed in accordance with a second channel condition between the communication relay apparatus and the second communication apparatus; and
   a deciding section configured to decide to perform a relay when the first channel condition is greater than or equal to the threshold value and to decide not to perform the relay when the first channel condition is less than the threshold value, wherein
   the threshold value used to compare with the first channel condition for deciding whether or not the relay is to be performed by the deciding section is changed to a lower value when the second channel condition is better than a previous second channel condition, and
   the threshold value used to compare with the first channel condition for deciding whether or not the relay is to be performed by the deciding section is changed to a higher value when the second channel condition is worse than the previous second channel condition.

2. The communication relay apparatus according to claim 1, wherein the threshold value is changed in accordance with a modulation level in addition to the second channel condition.

3. The communication relay apparatus according to claim 2, wherein the threshold value is changed to a lower value when the modulation level is lower than a previous modulation level and the threshold value is changed to a higher value when the modulation level is higher than the previous modulation level.

4. The communication relay apparatus according to claim 2, wherein the threshold value is changed to infinite when the second channel condition does not satisfy a required quality of the modulation level.

5. The communication relay apparatus according to claim 1, wherein the deciding section decides whether or not a relay is to be performed for each subchannel of a relay signal.

6. The communication relay apparatus according to claim 1, wherein the deciding section decides that the relay is to be performed when the first channel condition is equal to or higher than the threshold value.

7. The communication relay apparatus according to claim 1, wherein the first channel condition is indicated by channel quality, a channel estimation value, reception power, a number of loading bits, transmission power, transmission complex weight coefficients, or a matrix, singular value or eigenvalue used in a multi-input multi-output scheme.

8. The communication relay apparatus according to claim 1, further comprising:
   a second acquiring section configured to acquire the second channel condition; and
   a setting section configured to change the threshold value.

9. A communication relay method in a communication relay apparatus configured to relay a signal from a first communication apparatus to a second communication apparatus, the communication relay method comprising:
   acquiring a first channel condition between the first communication apparatus and the communication relay apparatus;
   receiving a threshold value changed in accordance with a second channel condition between the communication relay apparatus and the second communication apparatus; and
   deciding to perform a relay when the first channel condition is greater than or equal to the threshold value and deciding not to perforin the relay when the first channel condition is less than the threshold value, wherein
   the threshold value used to compare with the first channel condition for deciding whether or not the relay is to be performed is changed to a lower value when the second channel condition is better than a previous second channel condition, and
   the threshold value used to compare with the first channel condition for deciding whether or not the relay is to be performed is changed to a higher value when the second channel condition is worse than the previous second channel condition.

10. A communication apparatus that communicates with a communication relay apparatus configured to relay a signal from another communication apparatus to the communication apparatus, the communication apparatus comprising:
    an acquiring section configured to acquire a second channel condition between the communication relay apparatus and the communication apparatus;
    a setting section configured to set a threshold value used for deciding whether or not the communication relay apparatus performs a relay, in accordance with the second channel condition; and
    a transmitter configured to transmit the threshold value used to compare with a first channel condition between the other communication apparatus and the communication relay apparatus to the communication relay apparatus, wherein the setting section changes the threshold value used to compare with the first channel condition for deciding whether or not the communication relay apparatus performs the relay to a lower value when the channel condition is better than a previous channel condition, and changes the threshold value used to compare with the first channel condition for deciding whether or not the communication relay apparatus performs the replay to a higher value when the channel condition is worse than the previous channel condition.

11. The communication apparatus according to claim 10, wherein the setting section changes the threshold value in accordance with a modulation level in addition to the channel condition.

12. The communication apparatus according to claim 11, wherein the setting section changes the threshold value to a lower value when the modulation level is lower than a previous modulation level and changes the threshold value to a higher value when the modulation level is higher than the previous modulation level.

13. The communication apparatus according to claim 11, wherein the setting section changes the threshold value to infinite when the channel condition does not satisfy a required quality of the modulation level.

14. The communication apparatus according to claim 10, wherein the channel condition is indicated by channel quality, a channel estimation value, reception power, a number of loading hits, transmission power, transmission complex weight coefficients, or a matrix, singular value or eigenvalue used in a multi-input multi-output scheme.

15. A communication relay method performed by a communication apparatus with a communication relay apparatus configured to relay a signal from another communication apparatus to the communication apparatus, the communication relay method comprising:

acquiring a second channel condition between the communication relay apparatus and the communication apparatus;

setting a threshold value used for deciding whether or not the communication relay apparatus performs a relay, in accordance with the second channel condition; and transmitting the threshold value used to compare with a first channel condition between the other communication apparatus and the communication relay apparatus to the communication relay apparatus, wherein the threshold value used to compare with the first channel condition for deciding whether or not the communication relay apparatus performs the relay is changed to a lower value when the second channel condition is better than a previous second channel condition, and the threshold value used to compare with the first channel condition for deciding whether or not the communication relay apparatus performs the relay is changed to a higher value when the second channel condition is worse than the previous second channel condition.

* * * * *